United States Patent [19]

Chu

[11] 4,440,672

[45] Apr. 3, 1984

[54] PHOTOCHROMIC COMPOSITION RESISTANT TO FATIGUE

[75] Inventor: Nori Y. C. Chu, Southbridge, Mass.

[73] Assignee: American Optical Corporation, Southbridge, Mass.

[21] Appl. No.: 360,455

[22] Filed: Mar. 22, 1982

[51] Int. Cl.$^3$ .................... G02B 5/23

[52] U.S. Cl. .................... 252/586; 350/354

[58] Field of Search .................... 252/586; 350/354

[56] References Cited

U.S. PATENT DOCUMENTS

| | | | |
|---|---|---|---|
| 3,212,898 | 10/1965 | Cerreta | 96/90 |
| 3,666,352 | 5/1972 | Wagner et al. | 350/160 |
| 4,215,010 | 7/1980 | Hovey et al. | 252/300 |
| 4,342,668 | 8/1982 | Hovey et al. | 252/586 |

FOREIGN PATENT DOCUMENTS

| | | | |
|---|---|---|---|
| 49-53180 | 5/1974 | Japan | 252/586 |

OTHER PUBLICATIONS

Flood, J., et al., "Quenching of Singlet Molecular Oxygen by Polyolefin Additives in Carbon Disulfide Solution," (1973).

Carlsson, D. J., et al., "Singlet Oxygen Quenching in the Liquid Phase by Metal (II) Chelates," *Journal of the American Chemical Society*, 12/13/72.

Carlsson, D. J., et al., "The Possible Importance of Singlet Oxygen Quenching Reactions in the Photostabilization of Polyolefins," *Polymer Letters Edition, vol. II*, pp. 61-65 (1973).

Furue, H., et al., "Deactivation of Single Oxygen by Polyolefin Stabilizers," *Single Oxygen*, pp. 316-319 (1978).

Scott, Gerald, "Mechanisms of Photodegration and Stabilization of Polyolefins," pp. 340-366.

*Primary Examiner*—Deborah L. Kyle

*Attorney, Agent, or Firm*—Kenway & Jenney

[57] ABSTRACT

The organic photochromic composition of this invention comprises spiro [indoline-2,3'-[3H]-naphth [2,1-b] [1,4] oxazine] (SO) dye and an unconventional ultraviolet stabilizer. The ultraviolet stabilizer improves the light fatigue resistance of the SO dye and will not hinder the photocolorability of the photochromic composition.

26 Claims, No Drawings

PHOTOCHROMIC COMPOSITION RESISTANT TO FATIGUE

BACKGROUND OF THE INVENTION

The invention relates to a photochromic composition, and more particularly to an organic photochromic composition comprising spiro[indoline-2,3'-[3H]-naphth[2,1-b][1,4]oxazine] (SO) dye and an unconventional ultraviolet (UV) stabilizer.

Compounds which undergo reversible photo-induced color changes are termed photochromic compounds. When subjected to ultraviolet light or visible irradiation, these photochromic compounds change their transmission. They subsequently revert to their original color state when they are subjected to a different wavelength of radiation or the initial light source is removed.

Although the organic photochromic materials have been known for over 50 years, they have not had widespread industrial or commercial use. This is primarily due to the irreversible decomposition phenomenon, generally known as light fatigue. Repeated exposure to light cause the photochromic materials to lose their photochromism.

It is thought that light or heat or both light and heat are responsible for the photodecomposition of organic photochromic compounds. Thus, many people have tried to increase the light fatigue resistance of the compounds by adding numerous conventional antioxidants or ultraviolet light absorbers. For example, U.S. Pat. No. 3,212,898 teaches the use of conventional UV absorbers such as benzophenone and benzotriazole to increase the photochromic life of photochromic benzospiropyran compounds. Similarly, U.S. Pat. No. 3,666,352 teaches the use of conventional UV light absorbers in photochromic mercury thiocarbazonate lenses, transparent to radiation of wavelengths greater than 4200 Angstrom units and opaque to radiation of wavelengths less than 4200 Angstrom units, in order to substantially increase the durability of the lenses towards photochemical degradation.

One class of organic photochromic compounds, spiro[indoline-2,3'-[3H]-naphth[2,1-b][1,4]oxazine] (SO) dyes are known to have good light fatigue resistance. This class of photochromic compounds has been disclosed in U.S. Pat. Nos. 3,562,172, 3,578,602, and 4,215,010. Although a photochromic article or lens made from this class of compounds shows excellent light fatigue resistance as compared to one made from other photochromic compounds, further improvement of the light fatigue resistance is desirable in order to broaden the use of the photochromic article and to increase its useful lifetime. SO dyes with improved light fatigue resistance would have a particular utility in fabricating photochromic sunglasses, opthalmic lenses, ski goggles, window coatings and the like.

The precise mechanism for photodecomposition of SO dye is not yet fully understood. Although some circumstantial evidence indicates that oxygen is involved in the photodecomposition process, the traditional antioxidants (hindered phenols and amines) do not improve the light fatigue resistance of SO dyes. The conventional UV stabilizers, substituted benzophenones and benzotriazoles, cause a small improvement in the light fatigue resistance of SO dyes, but they cannot be used effectively since they create a screening effect by absorbing UV radiation strongly in the region where the SO dyes absorb UV radiation. By competing with the SO dyes to absorb UV light, these conventional stabilizers subsequently decrease the effective light intensity for SO dye activation. Furthermore, some of the conventional UV stabilizers are detrimental to SO dyes under certain conditions.

Accordingly, it is a principal object of the present invention to improve the light fatigue resistance of an organic photochromic composition containing SO dye.

It is another object of the present invention to improve the light fatigue resistance of these photochromic compositions without hindering their photocolorability.

It is a further object of the present invention to use such improved photochromic compositions to fabricate photochromic articles such as sunglasses, opthalmic lenses, ski goggles, window coatings and the like.

SUMMARY OF THE INVENTION

The problems of the prior art are overcome by the discovery that a group of unconventional UV stabilizers will improve the light-fatigue resistance of SO dyes, while not affecting their photocolorability. These unconventional UV stabilizers belong to the class of peroxide decomposers or excited state quenchers. The preferred UV stabilizers are singlet oxygen quenchers, and more particularly are complexes of $Ni^{2+}$ ion with some organic ligand. These $Ni^{2+}$ complexes are normally used in polyolefins to provide protection from photodegradation. These unconventional UV stabilizers will not hinder the photocolorability of SO dyes, since they have a minimal absorption in the UV region where SO dyes absorb. The SO dye and unconventional UV stabilizer may be incorporated within optically clear plastics to make a photochromic element suitable for a photochromic sunglass lens, ski goggle, or the like.

DESCRIPTION OF THE PREFERRED EMBODIMENT

The organic photochromic composition of the present invention comprises spiro[indoline-2,3'-[3H]-naphth[2,1-b][1,4]oxazine] (SO) dye

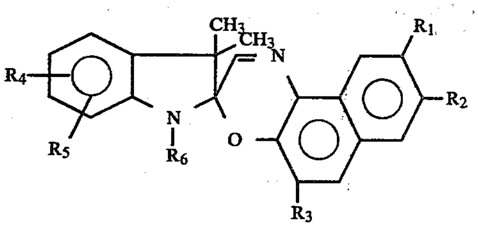

wherein one of $R_1$, $R_2$ and $R_3$ is hydrogen or halogen or lower alkoxy and the others are hydrogen, $R_4$ and $R_5$ are hydrogen, lower alkyl, lower alkoxy or halogen, and $R_6$ is lower alkyl; and an unconventional UV stabilizer. The unconventional UV stabilizer belongs to the class of peroxide decomposers or excited state quenchers and is preferably a singlet oxygen quencher.

Between 0.1 and about 15% by weight of the SO dye and between 0.01 and about 5% by weight of the UV stabilizer, depending on its solubility, can be incorporated into an optically clear plastic film having enhanced light fatigue resistance. The optically clear matrix will preferably have a thickness in the range of 0.0001–2.0 inch.

The SO dye and UV stabilizer may also be mixed in solution with an optically clear polymer which is thereafter cast as a film or lens, or a polymer which is injection molded or otherwise shaped into a film or lens; or a prepolymerized film or lens containing the UV stabilizer may be immersed in a dye bath comprising SO dye dissolved in a solution of organic solvents such as alcohol, toluene, halogenated hydrocarbon or the like. Other methods of blending the UV stabilizer with the SO dye and optically clear polymer, such as coating or laminating may be employed also.

UV stabilizers useful herein include complexes of $Ni^{2+}$ ion with some organic ligand, cobalt (III) tris-di-n-butyldithiocarbamate, ferric Tris-di-isopropyldithiocarbamate and cobalt(II)di-iso-propyldithiocarbamate.

The preferred UV stabilizers are $Ni^{2+}$ complexes and more particularly [2,2'-Thiobis[4-(1,1,3,3-tetramethylbutyl)phenolato](butylamine)]nickel

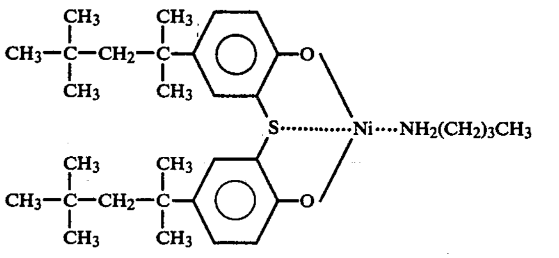

sold under the tradename of Cyasorb UV 1084 obtained from the American Cyanamid Company; Nickel [O-ethyl(3,5-di-tert-butyl-4-hydroxybenzyl)]phosphonate

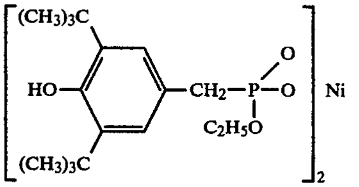

sold under the tradename of Irgastab 2002 obtained from the Ciba-Geigy Corporation; Nickel dibutyldithiocarbamate

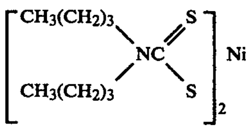

sold under the tradename of Rylex NBC obtained from E. I. duPont de Nemours & Company; Bis[2,2'-thiobis-4-(1,1,3,3-tetramethylbutyl)phenolato]nickel

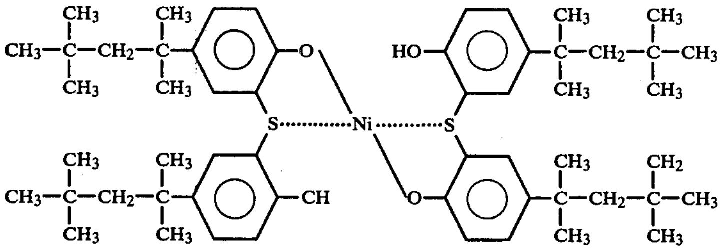

sold under the tradename of UV-Chek AM 101 obtained from the Ferro Corporation; and other $Ni^{2+}$ complexes sold under the tradenames of UV-Chek AM 105, UV-Chek AM 126, and UV-Chek AM 205 which can also be obtained from the Ferro Corporation.

The preferred SO dyes for use in accordance with the invention are 1,3,3,4,5-pentamethyl-9'-methoxy-spiro [indoline-2,3'-[3H]-naphth[2,1-b][1,4]oxazine, 1,3,3,5,6-pentamethyl-9'-methoxy-SO, 1,3,3,-trimethyl-5'-methoxy SO, 1,3,3-trimethyl-5-methoxy SO, 1,3,3,4,5-pentamethyl-8'-bromo SO and 1,3,3,5,6-pentamethyl-8'-bromo SO.

The preferred transparent plastic hosts are cellulose acetate butyrate (CAB), CR-39 TM, a diethylene glycol bis(ally carbonate) obtained from PPG Industries, Inc., Lexan TM, a polycarbonate condensation product of bisphenol-A and phosgene, obtained from General Electric, and Plexiglas TM, a polymethyl methacrylate obtained from the Rohm and Haas Company. The invention is further illustrated by the following non-limiting examples:

EXAMPLE 1

A set of cellulose acetate butarate (CAB) films was cast from a 50 gram solution of 10% CAB in methylene chloride containing 100 mg 1,3,3,4,5-and 1,3,3,5,6-pentamethyl-9'-methoxyspiro[indoline-2,3'-[3H]-naphth[2,1-b][1,4]oxazine], A, isomer mixture and 50 mg of an antioxidant. The antioxidants used were 2,4,6-tri-tert-butyl-phenol, 6-tert-butyl-2,4-dimethylphenol, and N-phenyl-p-phenylenediamine. A control without the antioxidant was also cast.

The four CAB films were subjected to 20-hour cycle exposure in a Fadeometer manufactured by Atlas Electric Devices of Chicago, Ill. After five 20 hour cycles, the photochromism of the CAB films was tested by subjecting them to 10 minutes of UV activation by a Hg lamp. All the CAB films lost their photochromism.

EXAMPLE 2

A set of CAB films was prepared and tested in accordance with Example 1, except conventional ultraviolet light absorbers were used instead of the antioxidants. The conventional ultraviolet light absorbers used were 2-hydroxy-4-methoxybenzophenone (sold under the trade name of Cyasorb UV 9 obtained from the American Cyanamid Company), 2,2'-dihydroxy-4-methoxybenzophenone (sold under the tradename of Cyasorb UV 24 obtained from the American Cyanamid Company), and 2(2'-hydroxy-5'-methylphenyl)benzotriazole (sold under the tradename of Tinuvin P obtained from the Ciba-Geigy Corporation).

After five 20-hour cycle Fadeometer exposure, the control lost all its photochromism. As seen in Table 1, for the three CAB films compounded with conventional UV absorbers, the percentage of photocolorability left after 100 hours of exposure was small as compared to the freshly prepared samples. Table 1 also shows the reduction in photocolorability of the films due to the screening effect by the conventional ultraviolet light absorbers.

TABLE I

| Compound | Residual Photo-colorability after 100 hours of Fade-ometer Exposure (%) | Reduction in Photocolorability due to Screening Effect (%) |
|---|---|---|
| Cyasorb UV 9 | 18 | 8 |
| Cyasorb UV 24 | 24 | 17 |
| Tinuvin P | 16 | 25 |

EXAMPLE 3

A set of CAB films was prepared and tested in accordance with Example 1, except UV stabilizer $Ni^{2+}$ complexes were used instead of the antioxidants and the amount used for one of the $Ni^{2+}$ complexes, Rylex NBC, was 0.25% by weight instead of the usual 1% by weight.

After five 20-hour cycle Fadeometer exposure, the control lost all its photochromism. As seen in Table II, after 100 hours of exposure, the CAB films compounded with the Ni-complexes still showed good photochromism as compared to the freshly prepared samples. Also, there is a negligible reduction in photocolorability of the films when the unconventional UV stabilizer Ni-complexes are used.

TABLE II

| Compound | Residual Photo-colorability after 100 hours of Fade-ometer Exposure (%) | Reduction in Photo-colorability due to Screening Effect (%) |
|---|---|---|
| Cyasorb UV 1084 | 68 | Negligible |
| Irgastab 2002 | 54 | " |
| Rylex NBC | 47 | " |
| UV-Chek AM-101 | 23 | " |
| UV-Chek AM-105 | 33 | " |
| UV-Chek AM-126 | 59 | " |
| UV-Chek AM-205 | 63 | " |

EXAMPLE 4

A set of CAB films was prepared and tested in accordance with Example 3, except that 1,3,3-trimethyl SO dye was used in place of 1,3,3,4,5- and 1,3,3,5,6-pentamethyl-9'-methoxy SO dye.

As usual, the control lost its photochromism in less than 100 hours of Fadeometer exposure. As seen in Table III, after 100 hours of exposure, the CAB films compounded with the Ni-complexes still showed good photochromism as compared to the freshly prepared films.

TABLE III

| Compound | Residual Photocolorability after 100 hours of Fadeometer Exposure (%) |
|---|---|
| Cyasorb UV 1084 | 54 |
| Irgastab 2002 | 34 |
| Rylex NBC | 45 |
| UV-Chek AM-101 | 42 |
| UV-Chek AM-105 | 45 |
| UV-Chek AM-205 | 62 |

EXAMPLE 5

A set of CAB films was prepared and tested in accordance with Example 1, except 1,3,3-trimethyl-5'-methoxy SO dye was used instead of 1,3,3,4,5- and 1,3,3,5,6-pentamethyl-9'-methoxy SO dye and Cyasorb UV 1084 was used in place of an antioxidant. After five 20-hour cycle exposure in a Fadeometer, the control lost all its photochromism, however the film with Cyasorb UV 1084 still showed good photochromism.

EXAMPLE 6

A set of films was prepared and tested in accordance with Example 3 except Plexiglas was used instead of CAB and the films were subjected to four 20 hour cycles of Fadeometer exposure instead of five. After four cycles, the control lost all its photochromism, however, the films with the UV stabilizer Ni-complexes all showed good photochromic effect.

EXAMPLE 7

A set of films was prepared and tested in accordance with Example 3 except Lexan was used instead of CAB, 1,3,3-trimethyl SO dye was used instead of 1,3,3,4,5- and 1,3,3,5,6-pentamethyl-9'methoxy SO, A, isomer mixture, and the films were subjected to eight 20-hour cycle Fadeometer exposure instead of five. The control lost all its photochromism, however, even after 160 hours of exposure, the films with UV stabilizer Ni-complexes all showed good photochromic effect.

EXAMPLE 8

Two hundredths of a gram of UV-Chek AM 105 were dissolved in 20 grams of CR-39, and 0.8 grams of di-isopropyl peroxydicarbonate, a catalyst, was added. This solution was used to cast a CR-39 plate 1.25 mm in thickness. A control without the UV Chek was also cast.

The CR-39 plates with and without UV-Chek AM 105 were immersed in a dye bath containing 1,3,3,4,5- and 1,3,3,5,6-pentamethyl-9'-methoxy SO dye A, isomer mixture. The plates were exposed to 20 hour cycle exposure in a Fadeometer. After eight 20 hour cycles, the control lost 78% of its photocolorability. However, the plate with UV-Chek 105 lost only 47%.

The invention has been described with reference to its preferred embodiment, other embodiments can achieve the same results. Variations and modifications of the present invention will be obvious to those skilled in the art and it is intended to cover in the appended claims all such modifications and equivalent as follows in the true spirit and scope of this invention.

I claim:

1. An organic photochromic composition comprising:

at least one photochromic compound having the structural formula:

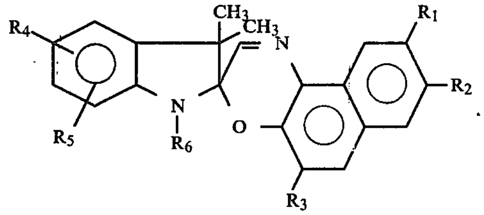

wherein one of $R_1$, $R_2$, and $R_3$ is hydrogen, halogen, or lower alkoxy and the others are hydrogen, $R_4$ and $R_5$ are hydrogen, lower alkyl, lower alkoxy, or halogen, and $R_6$ is lower alkyl; and an ultraviolet stabilizer belonging to the class of singlet oxygen quenchers.

2. The composition of claim 1 wherein the singlet oxygen quencher comprises a complex of $Ni^{2+}$ ion with an organic ligand.

3. The composition of claim 2 wherein the $Ni^{2+}$ complex comprises [2,2'-Thiobis[4-(1,1,3,3-tetramethylbutyl)phenolato](butylamine)]nickel.

4. The composition of claim 2 wherein the $Ni^{2+}$ complex comprises Nickel[O-ethyl(3,5-di-tert-butyl-4-hydroxybenzyl)]phosphonate.

5. The composition of claim 2 wherein the $Ni^{2+}$ complex comprises Nickel dibutyldithiocarbamate.

6. The composition of claim 2 wherein the $Ni^{2+}$ complex comprises Bis(2,2'-thiobis-4-(1,1,3,3-tetramethylbutyl)phenolato)nickel.

7. The composition of claim 1 wherein $R_1$ is methoxy and $R_4$, $R_5$ and $R_6$ are methyl.

8. The composition of claim 1 wherein $R_1$, $R_2$, $R_3$, and $R_4$ are hydrogen; $R_5$ is methoxy and $R_6$ is methyl.

9. The composition of claim 1 wherein $R_2$ is bromine; $R_1$ and $R_3$ are hydrogen; and $R_4$, $R_5$ and $R_6$ are methyl.

10. A photochromic article comprising:

(a) a plastic host;

(b) at least one photochromic compound having the structural formula:

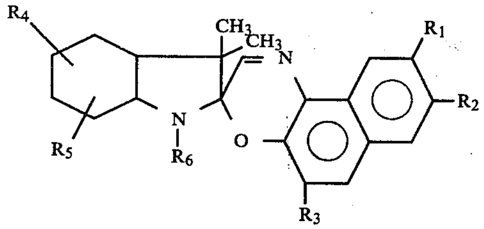

wherein one of $R_1$, $R_2$, and $R_3$ is hydrogen, halogen, or lower alkoxy and the others are hydrogen, $R_4$ and $R_5$ are hydrogen, lower alkyl, lower alkoxy or halogen, and $R_6$ is lower alkyl; and (c) an ultraviolet stabilizer belonging to the class of singlet oxygen quenchers.

11. The photochromic article of claim 10 wherein the singlet oxygen quencher comprises a complex of $Ni^{2+}$ ion with an organic ligand.

12. The photochromic article of claim 10 wherein the host is cellulose acetate butyrate.

13. The photochromic article of claim 10 wherein the host is polycarbonate resin.

14. The photochromic article of claim 10 wherein the host is polymethyl methacrylate.

15. The photochromic article of claim 10 wherein the host is diethylene glycol bis(allyl carbonate).

16. The photochromic article of claim 10 wherein the photochromic compound comprises 1,3,3,4,5-pentamethyl-9'-methoxyspiro[indoline-2,3'-[3H]-naphth[2,1-b][1,4]oxazine].

17. The photochromic article of claim 10 wherein the photochromic compound comprises 1,3,3,5,6-pentamethyl-9'-methoxyspiro[indoline-2,3'-[3H]-napth[2,1-b][1,4]oxazine].

18. The photochromic article of claim 10 wherein the photochromic compound comprises 1,3,3,5,6-pentamethyl-9'-methoxyspiro[indoline-2,3'-[3H]-naphth[2,1-b][1,4]oxazine].

19. The photochromic article of claim 10 wherein the photochromic compound comprises 1,3,3-trimethyl-5-methoxyspiro[indoline-2,3'-[3H]-naphth[2,1-b][1,4]oxazine].

20. The photochromic article of claim 10 wherein the photochromic compound comprises 1,3,3,5,6-pentamethyl-8'-bromo-spiro[indoline-2,3'-[3H]-naphth[2,1-b][1,4]oxazine].

21. The photochromic article of claim 10 wherein the photochromic compound comprises 1,3,3,4,5-pentamethyl-8'-bromo-sprio[indoline-2,3'-[3H]-naphth[2,1-b][1,4]oxazine].

22. A photochromic article comprising:

(a) diethylene glycol bis(allyl carbonate);

(b) 1,3,3,5,6-pentamethyl-9'-methoxyspiro[indoline-2,3'-[3H]-naphth[2,1-b][1,4]oxazine]; and (c) a $Ni^{2+}$ singlet oxygen quencher.

23. A photochromic article comprising:

(a) diethylene glycol bis(allyl carbonate);

(b) 1,3,3,4,5-pentamethyl-9'-methoxyspiro[indoline-2,3'-[3H]-naphth[2,1-b][1,4]oxazine]; and (c) a $Ni^{2+}$ singlet oxygen quencher.

24. A photochromic article comprising:

(a) diethylene glycol bis(allyl carbonate);

(b) 1,3,3-trimethyl-5-methoxy-spiro[indoline2,3'-[3H]-naphth[2,1-b][1,4]oxazine]; and (c) a $Ni^{2+}$ singlet oxygen quencher.

25. The photochromic article of claim 10, 23, or 24 wherein the article is a lens.

26. The photochromic article of claim 10, 23, or 24 wherein the article is an ophthalmic lens.

* * * * *